(12) United States Patent
Hoffman

(10) Patent No.: US 7,129,498 B2
(45) Date of Patent: Oct. 31, 2006

(54) COMPACT STRUCTURAL CT DETECTOR MODULE

(75) Inventor: David M. Hoffman, New Berlin, WI (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/668,581

(22) Filed: Sep. 23, 2003

(65) Prior Publication Data

US 2005/0061985 A1    Mar. 24, 2005

(51) Int. Cl.
*G01N 23/083* (2006.01)
*G01T 1/20* (2006.01)
*G01T 1/24* (2006.01)
*H01L 25/065* (2006.01)
*H01L 27/146* (2006.01)

(52) U.S. Cl. .................. 250/370.09; 250/370.11; 378/19

(58) Field of Classification Search ........... 250/370.09, 250/370.11, 370.12, 370.13, 363.02, 363.04; 378/11, 19
See application file for complete search history.

(56) References Cited

U.S. PATENT DOCUMENTS

| | | | | |
|---|---|---|---|---|
| 5,179,284 A | * | 1/1993 | Kingsley et al. | 250/370.11 |
| 5,847,499 A | * | 12/1998 | Rieppo et al. | 313/365 |
| 6,075,248 A | * | 6/2000 | Jeromin et al. | 250/370.09 |
| 6,522,715 B1 | | 2/2003 | Hoffman et al. | |
| 6,635,860 B1 | * | 10/2003 | Sato et al. | 250/214.1 |
| 6,667,482 B1 | * | 12/2003 | Von Der Haar | 250/370.11 |
| 2002/0070343 A1 | | 6/2002 | Hoffman | |

* cited by examiner

*Primary Examiner*—David Porta
*Assistant Examiner*—Frederick F. Rosenberger
(74) *Attorney, Agent, or Firm*—Joseph S. Heino; Patrick M. Bergin; Henry Policinski

(57) ABSTRACT

This invention relates generally to a system for differentiating material characteristics using a Computed Tomography imaging system. More particularly, it relates to a detector module for use with a hybrid-scintillator/photo sensor and direct conversion imaging system comprised of an x-ray transparent top layer; an electrode on said top; a block of direct conversion material, the electrode providing a common bias to the direct conversion material; a substrate material electrically connected with the direct conversion material; a signal processing chip electrically connected with the substrate; and a connector element electrically connected to the substrate.

17 Claims, 3 Drawing Sheets

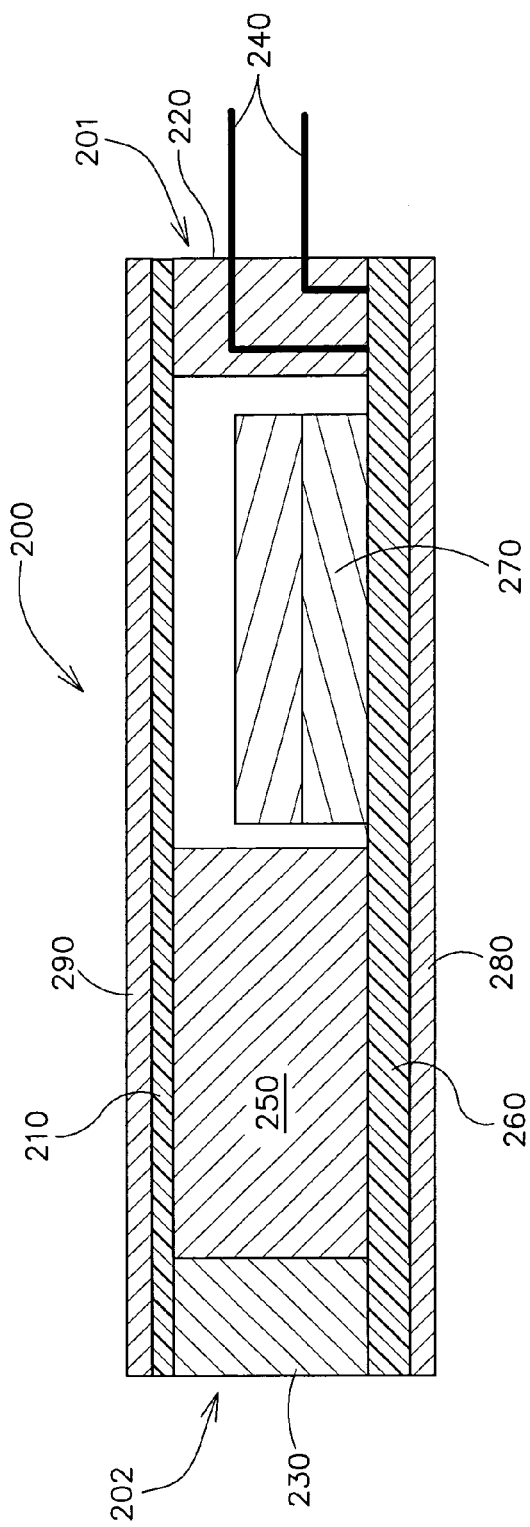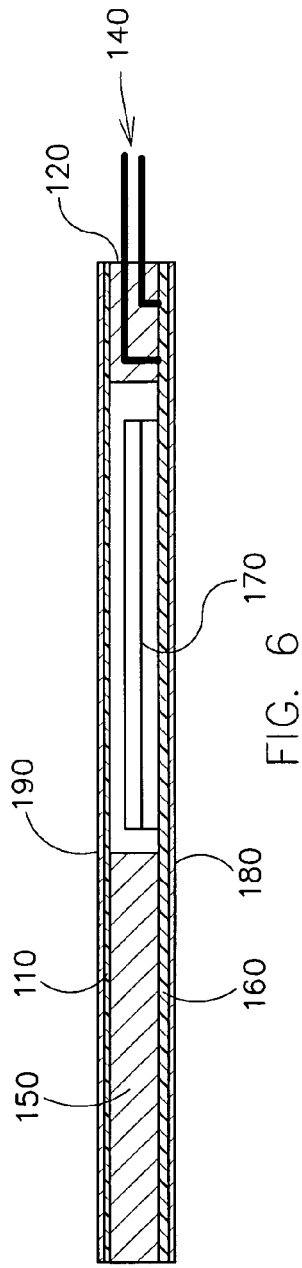

COMPACT STRUCTURAL CT DETECTOR MODULE

BACKGROUND OF THE INVENTION

This invention relates generally to a system for differentiating material characteristics using an imaging system. More particularly, it relates to a detector module for use with a hybrid-scintillator/photo sensor and direct conversion imaging system.

In at least one known computed tomography (CT) imaging system configuration having single and/or multi slice scintillator/photodiode rays, an x-ray source projects a fan-shaped, or cone-shaped, beam which is collimated to lie within an x-y-z volume of a Cartesian coordinate system. That x-y-z volume is generally referred to as an "imaging volume" and usually includes a set of x-y planes generally referred to as the "imaging planes." An array of radiation detectors, wherein each radiation detector includes at least one detector element, is disposed within the CT system so as to receive this beam. An object, such as a patient, is disposed within the imaging plane such that the x-ray beam passes through the object. As the x-ray beam passes through the object being imaged, the x-ray beam becomes attenuated before impinging upon the array of radiation detectors. The intensity of the attenuated beam radiation received at the detector array is responsive to the attenuation of the x-ray beam by the object. In turn, each detector element produces a separate electrical signal responsive to the beam attenuation at the detector element location. These electrical signals are referred to as x-ray "attenuation measurements".

In addition, the x-ray source and the detector array may be rotated by means of a gantry situated within the imaging volume and around the object to be imaged so that the angle at which the x-ray beam intersects the object constantly changes. A group of x-ray attenuation measurements, or, "projection data", from the detector ray at one gantry angle is referred to as a "view." A "scan" of the object comprises a set of views made at different gantry angles during one revolution of the x-ray source and the detector array. In an axial scan, the projection data is processed so as to construct an image that corresponds to two-dimensional slices taken through the object.

One method of reconstructing an image from a set of projection data is referred to as the "filtered back-projection technique." This process converts the attenuation measurements from a scan into discrete integers, ranging from −1,024 to +3,072, called "CT numbers" or "Hounsfield units" (HU). These HUs are used to control the brightness of a corresponding pixel on a cathode ray tube or a computer screen display in a manner responsive to the attenuation measurements. For example, an attenuation measurement for air may convert into an integer value of −1,000 HUs (corresponding to a dark pixel) and an attenuation measurement for very dense bone matter may convert into an integer value of +3,000 (corresponding to a bright pixel), whereas an attenuation measurement for water may convert into an integer value of 0 HUs (corresponding to a grey pixel). This integer conversion or "scoring" allows a physician or a technician to determine the density of matter based upon the intensity of the computer display and thus locate anatomical landmarks and identify areas of concern.

Typically, radiation detector rays that are used in imaging systems, such as the T imaging described herein, include single and/or multi-slice scintillator/photodiode etectors. A scintillation detector is constructed of scintillation material, such as cadmium tungstate (CDW04) or rare earth ceramics and operates by receiving x-ray photons emitted by an x-ray source and by converting these x-ray photons into a digital signal that is proportional to the attenuated x-ray energy received. These digital signals are then processed and turned into image data.

One goal of CT imaging is to utilize multi-energy scanning techniques to differentiate tissues and/or materials having varying atomic number and densities, such as calcium and/or iodine. Historically, this has been accomplished using an imaging system having a scintillation detector either by taking single slice images with a single slice CT imaging system having two different x-ray beam filters, or by taking single slice images with a single slice CT imaging system having two different x-ray tube kVp's that exactly overlap spatially, but at a slightly later time, and then processing these two images to separate materials having varying atomic numbers and densities, using suitable known methods such as image subtraction.

For example, using a single slice CT imaging system, a first single slice image would be obtained. The x-ray kVp or the filter at the x-ray tube would then be changed and a second single slice image would be obtained at the same patient location. As mentioned above, the two slices of image data would then be processed to separate the materials of varying atomic numbers and densities within the obtained sliced plane.

Unfortunately, this is an expensive, time consuming and involved process and although a CT imaging system having a direct conversion (DC) detector could conceivably be utilized as the CT imaging system for performing the above-mentioned process, the DC detector would not be able to count the x-rays fast enough to support CT flux rates and/or scan times. Thus, if used in the current mode, the obtained information would suffer from a very high amount of non-linearities that would be very difficult or even impossible to correct in order to achieve artifact free scanning.

The above discussed and other features and advantages of the embodiments will be appreciated and understood by those skilled in the art from the following detailed description and drawings.

BRIEF SUMMARY OF THE INVENTION

The above discussed and other drawbacks and deficiencies are overcome or alleviated by a hybrid scintillation/direct conversion computed tomography (CT) imaging system comprising: a gantry, wherein the gantry defines a patient cavity and includes an x-ray source and a radiation detection apparatus, wherein the radiation detection apparatus includes a first radiation detector and a second radiation detector and wherein the x-ray source and the radiation detection apparatus are rotatingly associated with the gantry so as to be separated by the patient cavity; a patient support structure movingly associated with the gantry so as to allow communication with the patient cavity; and a processing device, wherein the processing device is communicating with the radiation detection apparatus.

In order to accomplish the above mentioned, the radiation detector described herein provides for a compact, modular radiation detector that is able to move fully or partially in and out of the x-ray beam in front of an existing CT scintillator. The radiation detector is comprised of a plurality of detector modules. Each detector module is comprised of top composite layer that is radiographically transparent. Immediately underneath the composite layer is a high voltage electrode. The high voltage electrode provides the common bias to a direct conversion material. The present invention also provides for a scintillator/photodiode assembly immediately underneath the composite layer. The scintillator/photodiode assembly is connected to either a flex circuit, a multi-layer ceramic substrate or silicon substrate for signal routing to a data processing unit. Preferably, a silicon substrate is used as it has the highest run density of the known alternatives. The signals are then routed again through the substrate material to an end block connector. The connector is then connected to subsequent signal processing electronics. The foregoing and other features and advantages of the present invention will be apparent from the description that follows.

BRIEF DESCRIPTION OF THE DRAWINGS

FIG. 5 is an elevational view of the second embodiment of the present invention

FIG. 6 is an elevational view of the true aspect ratio of the detector modules of the present invention.

DETAILED DESCRIPTION

Figure 1:
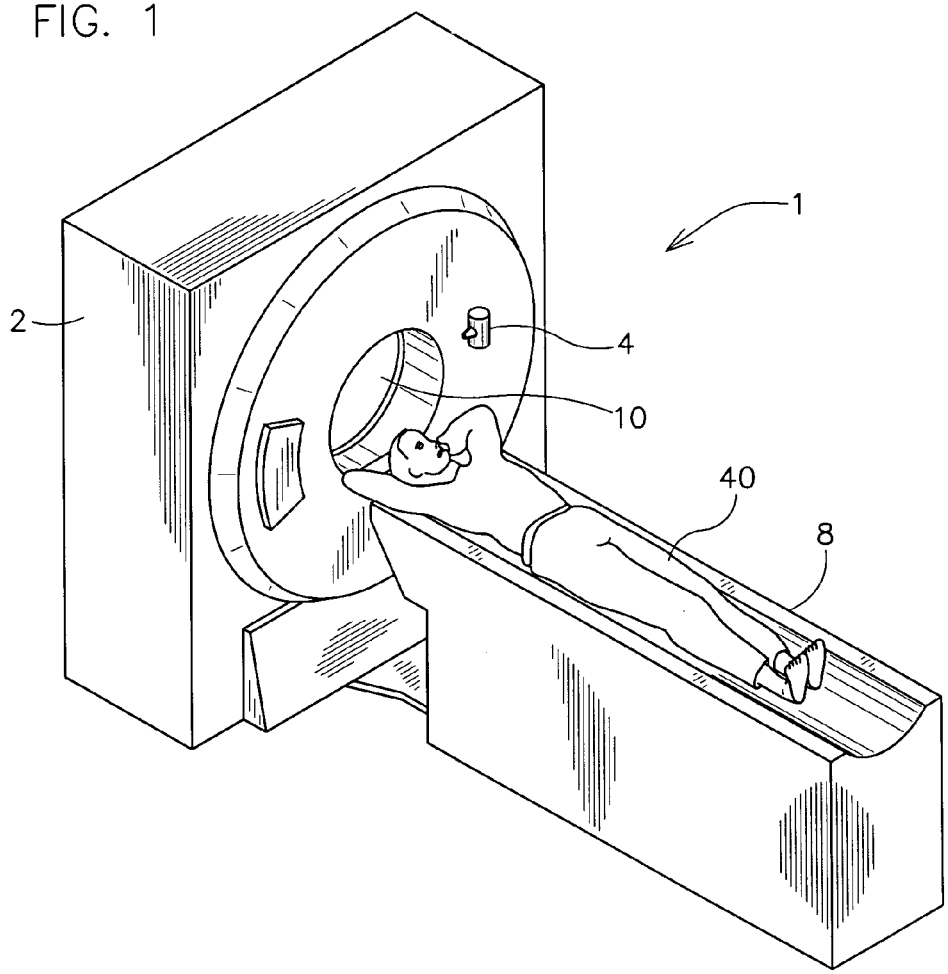
FIG. 1 is a perspective view of a CT imaging system and a patient disposed for imaging.
Figure 2:
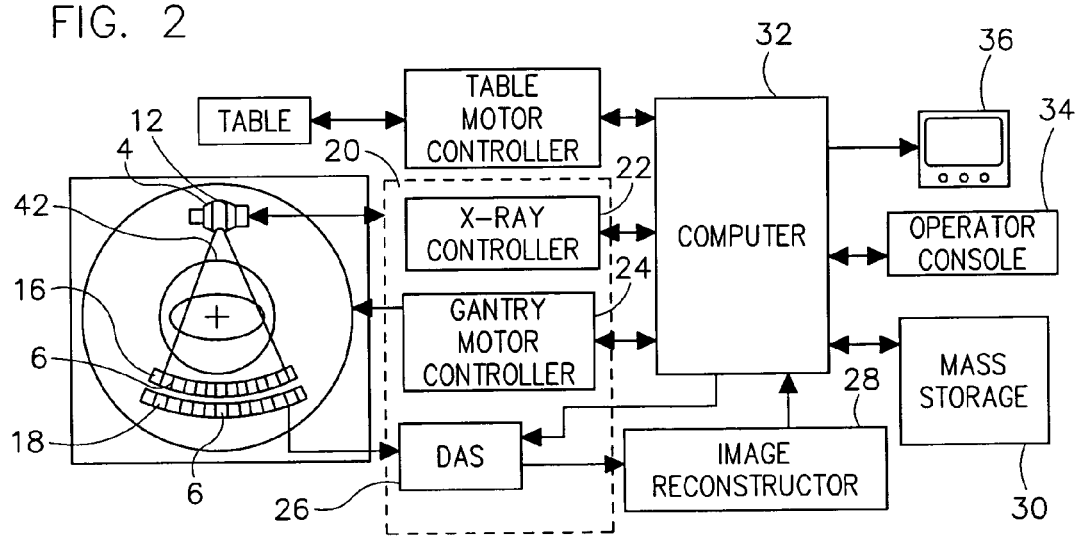
FIG. 2 is a block schematic diagram of a hybrid scintillation/direct conversion CT imaging system in accordance with the present invention.
Figure 3:
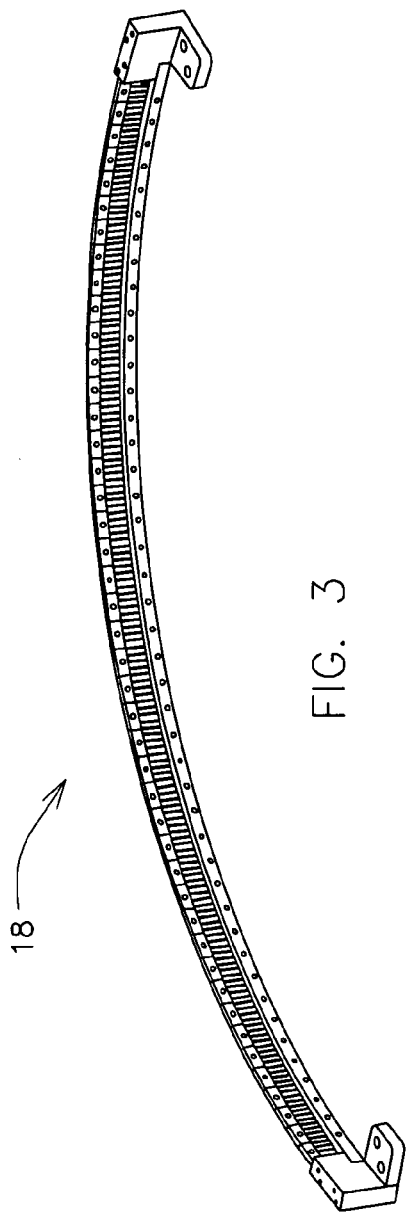
FIG. 3 is a perspective view of a detector array in accordance with the present invention.

Referring now to the drawings in detail, wherein like numbered elements correspond to like elements throughout. FIGS. 1 and 2 show pictorial and block schematic views, respectively, of a computed tomography (CT) imaging system 1. The hybrid scintillation/direct conversion CT imaging system 1 includes a gantry 2 having an x-ray source 4, a radiation detection apparatus 6, a patient support structure 8, and a patient cavity 10, wherein x-ray source 4 and radiation detection apparatus 6 are disposed so as to be separated by the patient cavity 10. X-ray source 4 and radiation detection apparatus 6 are rotatingly disposed relative to the gantry 2 and the patient support structure 8, so as to allow x-ray source 4 and radiation detection apparatus 6 to rotate around the patient support structure 8 when the patient support structure 8 is disposed within patient cavity 10. X-ray projection data is obtained by rotating the x-ray source 4 and the radiation detection apparatus 6 around the patient 40 during a scan.

In more detail, x-ray source 4 includes a first x-ray emitter 12 and radiation detector apparatus 6 which includes a first radiation detector 16 and second radiation detector 18. First x-ray emitter 12 is opposingly disposed relative to first radiation detector 16 and second radiation detector 18 such that first x-ray emitter 12 is separated from first radiation detector 16 and second radiation detector 18 by patient cavity 10. X-ray source 4 and radiation detection apparatus 6 are communicated with a control mechanism 20 associated with CT imaging system 1. Control mechanism 20 controls the rotation and operation of x-ray source 4 and/or radiation detection apparatus 6. Control mechanism 20 includes an x-ray controller 22 in electronic communication with the x-ray source 4, a gantry motor controller 24, and a data acquisition system (DAS) 26. The DAS 26 is communicatively attached to radiation detection apparatus 6, wherein an x-ray controller 22 provides power and timing signals to x-rays source 4. Gantry motor controller 24 controls the rotational speed and angular position of x-ray source 4 and radiation detector apparatus 6. DAS 26 receives the electrical signal data produced by radiation detection apparatus 6 and converts this data into digital signals for subsequent processing. CT imaging system 1 also includes an image reconstruction device 28, a data storage device 30 and processing device, or computer 32, wherein processing device 32 is electrically connected with image reconstruction device 28, gantry motor controller 24, x-ray controller 22, data storage device 30, an input device 34 and an output device, or display 36. Moreover, CT imaging system 1 also includes a table controller connected with processing device 32 and patient support structure so as to control the patient support structure 8 relative to patient cavity 10.

In general, first radiation detector 16 is disposed so as to be adjacent to second radiation detector 18. The patient 40 is disposed upon patient support structure 8 and patient support structure 8 is disposed within patient cavity 10. Imaging system 1 is then operated so as to cause the radiation source 4 to emit and project an x-ray beam 42 toward the radiation detection apparatus 6 so as to pass through patient 40 and thereby create an attenuated x-ray beam 42 that is responsive to patient 40. X-ray beam 42 is preferably collimated by a collimator so as to lie within an X-Y-Z volume of a Cartesian coordinate system referred to as the "imaging volume".

After passing through and becoming attenuated by patient 40, radiation detection apparatus 6 receives the attenuated x-ray beam 42, thus causing first radiation detector 16 to generated first detector data and second radiation detector 18 to generate second detector data, wherein first detector data and second detector data are generated in a manner responsive to attenuated x-ray beam 42. First detector data and second detector data are then processed so as to generate image data. This is accomplished by communicating first detector data and second detector data to DAS 26, which then converts first detector data and second detector data into digital signals responsive to patient 40, first radiation detector 16 and second radiation detector 18. First detector data, second detector data and the digital signals are then communicated to image reconstruction device 28 which generates image data by performing high speed reconstruction. This information is then communicated to a processing device 32, which stores the image data in the data storage device 30 and displays the image data as an output via an output device 36.

When hybrid scintillation direct conversion imaging system 1 is used in a helical mode, adjacent slice planes though patient 40 may be viewed by multiple detector cells in the Z direction at slightly later points in time, if the rotational pitch of the radiation detection apparatus 6 has the appropriate width. Similarly, if two different types of radiation detectors were placed adjacent to each other in the Z direction, then adjacent slice planes through patient 40 could be viewed by multiple radiation detectors of a different type in the Z direction at slightly later points in time, again allowing for an appropriate rotational pitch of the radiation detection apparatus 6.

Therefore, first radiation detector 16 may be a scintillator detector/photo-sensor detector so as to allow for the collection of traditional information for creating anatomical detail for CT slices and second radiation detector 18 may be a direct conversion detector configured in x-ray counting and energy discrimination mode so as to count the attenuated x-rays and so as to measure the attenuated x-ray energy. This information on the number and energy of attenuated x-rays may provide tissue differentiation data that provides information about the elemental composition and/or density of various tissue materials, so as to allow for the discrimination of iodine, calcium and/or other materials as well. The information obtained from first radiation detector 16 and second radiation detector 18 may be super-positioned to create a single image having identically positioned and over lapping information of anatomically detail and/or tissue discrimination. Second radiation detector 18 may be of a single slice design and/or a multiple slice design. A multiple slice design may provide information on a variety of different tissue materials, whereas the single slice design may be integrated across multiple slices for improved statistics on an individual basis.

Beneficially, when a second radiation detector 18 is used in the x-ray counting and energy discrimination mode, very little x-ray dose is added to the CT exam because of the low level of x-rays required for energy discrimination. This implementation may be accomplished quickly because DC detectors currently operate in the x-ray counting and energy discrimination mode in existing BMD and GAMA camera systems. This embodiment allows for obtaining superposition of anatomical detail and tissue characterization information, as well as the measurement of scatter. The DC detector may be used to pre-measure patient 40 and adjust a CT system mA within a slice and/or from slice to slice in the area of the scintillator detector. Furthermore, the energy discrimination (ED) information obtained may be used to implement smart CT correction schemes, such as beam hardening and/or smart detector correction schemes. Also, in accordance with the second embodiment multiple types of operational modes may be implemented. The x-ray beam kVP may be varied in the Z direction if an x-ray attenuation material was provided at the x-ray tube and/or at the radiation detection apparatus 6 so as to enhance the collection of multi energy x-ray information in the area of the DC detector. The information obtained via the DC detector may then be processed so as to separate different densities of materials within a patient slice plane in a simple operational mode. Additionally, some multiple multi-energy CT slices taken at the same time as standard CT slices may be obtained for a different anatomical area and later superpositioned so as to separate multiple types of materials.

This embodiment allows the first x-ray beam 42 and the beam filtration to be tailored for desired system performance and also allows for the use of beams having different energies. It should be noted that each row detector can differentiate between multiple types of materials. As such, with multiple slices information can be obtained for larger amounts of different materials. The differential operation loads allow for detection of different materials using each row detector. They also allow multiple detector rows to be integrated for statistical quantification, analysis and a correction, such as for improving signal to noise ratio.

The present invention also provides for a second radiation detector 18 comprised of a plurality of CT detector modules 100. The CT detector module of the present invention provides a rigid structure which can placed in an array to form the second radiation detector 18. This second radiation detector, in one embodiment, would be comprised of approximately 57 detector modules 100 in each row. Each module has 16 cells in the X direction and any number in the Z direction based on the number of simultaneous slices of information to be collected per CT system rotation. In another embodiment, it would be comprised of two rows of detectors butted up against one another approximately 57 detector modules 100. This second radiation detector 18 can be placed adjacent to or partially or fully in front of the first radiation detector 16 such that the first radiation detector 16 and the second radiation detector 18 collect data simultaneously.

Figure 4:
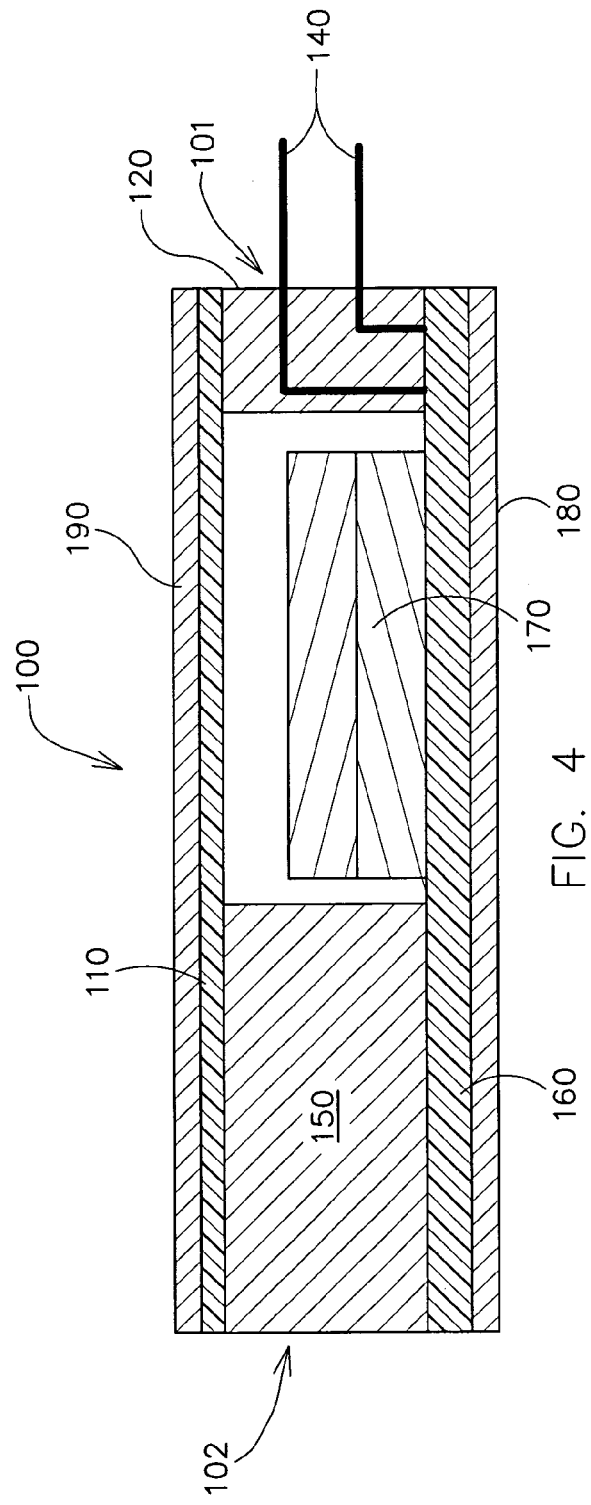
FIG. 4 is an elevational view of a detector module of the present invention expanded along its y-axis for clarity.

As shown in FIG. 4, the CT detector module 100 of the present invention is comprised of a top graphite layer 190, a bottom graphite layer 180, a high voltage electrode 110, a support 120, a direct conversion material or scintillator/photodiode 150, at least one ASICS chip 170, a substrate 160 and a connector 140.

More specifically, the invention provides for the top and bottom graphite layers 180, 190 to serve as structural "sandwich" type layers. At least the top graphite layer 190 is x-ray translucent and readily admits x-rays to the direct conversion or scintillator/photodiode. Immediately beneath the top graphite layer 190 is a high voltage electrode 110, which is only used in the case of the direct conversion detector.

The high voltage electrode 110 is placed over the direct conversion material. In general, a charging voltage is applied between the substrate 160 and the top electrode 110 to create an electric field across the direct conversion material 150. The detected x-ray radiation irradiates the area of direct conversion material 150. The received x-rays create electron-hole pairs which, under the influence of the applied electric field, migrate across the direct conversion material 150. This migration results in a measurable accumulation of charge. The amount of charge crossing the direct conversion material 150 varies proportionally with the radiation exposure. The stored charge is read-out and processed to create an image. One manner of depositing the high voltage electrode 110 on the graphite top cover 190 is to use a sputtering technique, which is known in the art. Another possibility is to employ a vapor deposition technique, also known in the art. Neither technique is intended to be a limitation of the present invention.

One potential choice for the direct conversion material 150 is Cadmium Zinc Telluride, or CZT. However, many other materials could also be used. The direct conversion material may also be replaced with a scintillator/photodiode assembly. In either case, the direct conversion or scintillator/photodiode assembly is connected to either a silicon substrate, a flex circuit, or a multi-layer ceramic substrate 160 for signal run routing. Preferably, a silicon substrate 160 is used because it offers the highest run densities of the alternative substrate options.

The signal runs are then routed to either one or more Application-Specific Integrated Circuits (ASICs) 170. The ASICs 170 perform some initial signal processing. The signals are then routed again to the substrate 160 to an end block connector 140. As before, the substrate 160 could consist of silicon substrate, a flex circuit or a multilayer ceramic substrate, although the silicon substrate is preferred.

The connections between both the direct conversion material 150 and the substrate 160 and the ASICS 170 and the substrate 160 could be accomplished by several known methods. Some of these methods include bump bonding and conductive epoxy dots. However, other methods are well known in the art and could be used with the same results.

The end block connector 140 generally exits through a support 120 at the first end of the detector module 101 and the support at the second end of the detector module 102 is the direct conversion material 150. In one embodiment of the detector module, this support 120 is the only support for the detector module 100. In this case, the detector modules 100 could be used back to back in the Z-direction, or butted up against each other. This embodiment could obviously provide faster imaging, although possibly at the expense of image resolution.

In another possible embodiment of the detector module 200, a second support 230 is used at the second end of the detector module 202. In light of the above, this particular embodiment would not be able to provide a continuous imaging area were it butted to another detector module 200 because of the support 220. This second embodiment of the detector module is shown in more detail in FIG. 5 and also includes top and bottom graphite layers 280, 290, a high voltage electrode 210 (For use with the direct conversion detector only), a layer of direct conversion material 250, a substrate 260, at least one ASICS chip 270, a first end support 220 at the first end of the detector module 201 and an end block connector 240. The second embodiment further includes a second end support 230 at the second end 202 of the detector module interposed between the top and bottom graphite covers 280, 290.

This compact modular structure of the present detector module 100 permits construction of a rigid array which can then be moved mechanically in and out of the x-ray beam of an existing CT imaging system 1 either fully or partially overlapping the existing scintillator/photodiode detector array in the Z-axis direction. The ability to move the detector array allows the use of the CT imaging system 1 in normal density-detection mode, in atomic differentiation mode and in both modes simultaneously. The present detector also permits the gathering of both density and atomic differentiation image information without increasing the x-ray fan beam width in the Z-axis direction, which could result in undesirable cone beam image artifacts.

While the invention has been described with reference to an exemplary embodiment, it is to be understood by those skilled in the art that various changes may be made and equivalents may be substituted for elements thereof without departing from the scope of the invention. In addition, many modifications may be made to adapt to a particular situation or material to the teachings of the invention without departing from the scope thereof. Therefore, it is intended that the invention not be limited the particular embodiment disclosed as the best mode contemplated for carrying out this invention, but that the invention will included all embodiments falling within the scope of the appended claims.

PARTS LIST

1. Computed Tomography imaging system
2. Gantry
4. X-ray source
6. Radiation detection apparatus
8. Patient support structure
10. Patient cavity
12. X-ray emitter
16. First radiation detector
18. Second radiation detector
20. Control mechanism
22. X-ray controller
24. Gantry motor controller
26. Data acquisition system (DAS)
28. Image reconstruction device
30. Data storage device
32. Computer
34. Input device
36. Display
38. Table controller
40. Patient
42. X-ray beam
100. CT detector module
101. first end of 100
102. second end of 100
110. High voltage electrode
120. Support
140. Connector
150. Direct conversion material
160. Substrate
170. Application-Specific Integrated Circuits (ASICs)
180. Bottom graphite layer
190. Top graphite layer
200. CT detector module
201. First end of 200
202. Second end of 200
210. High voltage electrode
220. First end support
230. Second end support
240. End block connector
250. Direct conversion material
260. Substrate
270. ASICs
280. Bottom graphite layer
290. Top graphite layer

What is claimed is:

1. A low profile computed tomography (CT) detector module for use in combination with an existing CT detector system, the detector system having a scintillator/photodiode array, the detector module having a first end comprising:
    an x-ray transparent top layer;
    an electrode on said top layer;
    a block of direct conversion material, the electrode providing a common bias to the direct conversion material;
    a substrate material electrically connected with the direct conversion material;
    a signal processing chip electrically connected with the substrate material;
    an end block support located at one end of the detector module physically interposed between the electrode and the substrate material, said end block support both acting as a support member and containing a connector in electrical connection with the substrate and further signal processing hardware;
    a rigid graphite bottom layer supporting the substrate material, the top layer and bottom layer forming a sandwich type construction with the electrode, direct conversion material or scintillator/photodiode array, the substrate material and the signal processing chip being contained therebetween.

2. The low profile detector module of claim 1 wherein the detector module is buttable.

3. The low profile detector module of claim 1, the detector module also having a second end, the second end of the detector module being supported by the direct conversion material interposed between the electrode and the substrate and the direct conversion material extends to the edge of the detector module.

4. The low profile detector module of claim 1 wherein the detector module is not buttable.

5. The low profile detector module of claim 4 wherein the detector module has a second end and the second end of the detector module has a second end support interposed between the top x-ray transparent layer and the graphite bottom layer.

6. A low profile detector module for a hybrid scintillation/direct conversion Computed Tomography (CT) imaging system, the CT imaging system having a scintillator/photodiode detector array, the detector module comprising:
a top x-ray translucent layer;
a bottom layer;
a high voltage electrode situated below the top layer;
a substrate material situated over a portion of the bottom layer;
a direct conversion block interposed between and in electrical connection with the electrode and part of the substrate material;
an ASICS chip in electrical connection with the substrate material:
an end block support located at a first end of the detector module, the end block support being physically interposed between the electrode and the substrate material, said end block support both acting as a support member and containing a connector in electrical connection with the substrate material and further signal processing hardware, the top layer and bottom layer forming a sandwich type construction with the electrode, direct conversion block or scintillator/photodiode array, substrate material and the ASICS chip being contained therebetween.

7. The low profile detector module of claim 6 wherein the detector module is buttable.

8. The low profile detector module of claim 7, the detector module also having a second end, the second end of the detector module being supported by the direct conversion material interposed between the electrode and the substrate and the direct conversion material extends to the edge of the detector module.

9. The low profile detector module of claim 8 wherein the second end of the detector module has an end support interposed between the top and bottom layers.

10. The low profile detector module of claim 6 wherein the detector module is not buttable.

11. A low profile detector module for a hybrid scintillation/direct conversion Computed Tomography (CT) imaging system, the CT imaging system having a scintillator/photodiode detector array, the detector module comprising:

A top x-ray translucent layer having at least a bottom surface;
A high voltage electrode deposited over the bottom surface of the top x-ray translucent layer;
A bottom layer having at least a top surface;
A substrate material situated over a portion of the top surface of the bottom layer;
A direct conversion block interposed between and in electrical connection with the electrode and part of the substrate material;
An ASICS chip in electrical connection with the substrate material; and
Said substrate material in electrical connection with further signal processing hardware; and
An end block support located at a first end of the detector module, the detector module having a first end and a second end physically interposed between the electrode and the substrate material, said end block support both acting as a support member and containing a connector in electrical connection with the substrate material and further signal processing hardware, the top layer and bottom layer forming a sandwich type construction with the electrode, direct conversion block or scintillator/photodiode array, substrate material and the ASICS chip being contained therebetween.

12. The low profile detector module of claim 11 wherein the detector module is buttable.

13. The low profile detector module of claim 11 wherein the substrate material is a silicon substrate.

14. The low profile detector module of claim 11 wherein the substrate material is a high density flex circuit.

15. The low profile detector module of claim 11 wherein the substrate material is a multi-layer ceramic substrate.

16. The low profile detector module of claim 11 wherein the detector module is not buttable.

17. The low profile detector module of claim 16 wherein the second end of the detector module has an end support interposed between the top and bottom layers.

* * * * *